UNITED STATES PATENT OFFICE.

JOHANN KARL KESSLER, OF MILWAUKEE, WIS., ASSIGNOR OF TWO-THIRDS TO MORRIS ROTH AND GEORGE SYLVESTER, BOTH OF SAME PLACE.

PROCESS OF MAKING WHITE LEAD.

SPECIFICATION forming part of Letters Patent No. 292,119, dated January 15, 1884.

Application filed July 16, 1883. (No specimens.)

*To all whom it may concern:*

Be it known that I, JOHANN KARL KESSLER, a subject of the Emperor of Germany, residing at Milwaukee, in the county of Milwaukee and State of Wisconsin, have invented a certain new and Improved Process of Manufacturing White Lead; and I hereby declare the following to be a full, clear, and exact description of the same.

My invention relates to a process by which metallic lead may be converted into white lead with comparatively little trouble and expense and in a very short time. The conversion is effected with the aid of electrolysis, and for this purpose I employ a dynamo-electric machine and a vessel divided into two compartments by a partition less in height than the vessel itself, whereby the vessel may be filled with a liquid above the level of the partition, as described in my application, heretofore filed, for an improved process of manufacturing suboxide and the acetates of copper. In one of the compartments is placed the lead to be converted, in contiguous lumps, and it is connected by a copper wire to the positive pole of a dynamo-electric machine, whereby it constitutes the anode; and in the other compartment is placed a body of lead to serve as the cathode, being connected by a copper wire to the negative pole of the machine. The vessel is filled above the level of the partition with the acetate of an alkali—preferably acetate of potash or acetate of soda—to serve as the electrolyte. An electric current is then passed through this solution, when, as a result, there is formed in that compartment which contains the anode a solution of an acetate of the oxide of lead, while in the compartment containing the cathode there is formed a caustic solution of an alkali—viz., a solution of caustic potash, or of caustic soda, or of whatever the alkali may be that is employed in the electrolyte. Upon mixing these two solutions together, (preferably in a separate vessel,) hydrated oxide of lead is precipitated in the form of a white powder, and the original acetate of an alkali is regenerated. In order to change this powder into white lead, it is only necessary to introduce into the liquid in which the precipitate is suspended a stream of carbonic-acid gas, at the same time stirring the liquid. The hydrated oxide of lead absorbs the carbonic acid rapidly, and is thereby changed into white lead. To perfect this product as an article of commerce, it must be gathered in filters, and thus separated from the regenerated solution, and finally washed and dried.

The regenerated solution may be used over again as an electrolyte for the purpose of converting a fresh supply of lead.

What I claim as new, and desire to secure by Letters Patent, is—

The process of making white lead, which consists in passing an electric current through an electrolyte composed of the acetate of an alkali in solution, using lead for both the anode and cathode, whereby a solution of acetate of the oxide of lead is formed at the positive pole and a caustic solution of the alkali is formed at the negative pole, keeping the products forming at the opposite poles separate from each other, then mixing the said products together, whereby hydrated oxide of lead is precipitated and the original solution of the acetate of an alkali regenerated, and then introducing carbonic-acid gas into the last-named solution, whereby the suspended precipitate is converted into white lead, substantially as described.

JOHANN KARL KESSLER.

In presence of—
    HENRY GOLL,
    FRED SCHRIBER.